(12) United States Patent
Bradfield

(10) Patent No.: US 10,605,218 B2
(45) Date of Patent: Mar. 31, 2020

(54) STARTER

(71) Applicant: BorgWarner, Inc., Auburn Hills, MI (US)

(72) Inventor: Michael D. Bradfield, Anderson, IN (US)

(73) Assignee: BORGWARNER INC., Auburn Hills, MI (US)

(*) Notice: Subject to any disclaimer, the term of this patent is extended or adjusted under 35 U.S.C. 154(b) by 454 days.

(21) Appl. No.: 15/429,563

(22) Filed: Feb. 10, 2017

(65) Prior Publication Data

US 2017/0152828 A1  Jun. 1, 2017

Related U.S. Application Data

(63) Continuation-in-part of application No. 13/801,668, filed on Mar. 13, 2013, now abandoned.

(51) Int. Cl.
| | |
|---|---|
| *F02N 11/08* | (2006.01) |
| *F02N 15/06* | (2006.01) |
| *F16H 37/04* | (2006.01) |

(52) U.S. Cl.
CPC ........ *F02N 11/0851* (2013.01); *F02N 11/087* (2013.01); *F02N 11/0855* (2013.01); *F02N 15/06* (2013.01); *F02N 11/0844* (2013.01); *F02N 2015/061* (2013.01); *F16H 37/04* (2013.01); *Y10T 74/132* (2015.01)

(58) Field of Classification Search
None
See application file for complete search history.

(56) References Cited

U.S. PATENT DOCUMENTS

| | | | |
|---|---|---|---|
| 3,646,820 A * | 3/1972 | Vogel | F02N 15/026 74/6 |
| 4,962,340 A | 10/1990 | Isozumi | |
| 5,013,950 A | 5/1991 | Isozumi | |
| 5,084,631 A * | 1/1992 | Shiroyama | F02N 15/066 290/48 |
| 5,760,487 A | 6/1998 | Kimura et al. | |
| 5,892,421 A * | 4/1999 | Matsushima | F02N 11/00 290/38 R |
| 6,109,122 A | 8/2000 | Bori et al. | |
| 6,633,099 B2 | 10/2003 | Fulton et al. | |
| 2014/0260792 A1 | 9/2014 | Bradfield | |
| 2018/0045161 A1* | 2/2018 | van der Kwaak | F02N 11/00 |

\* cited by examiner

*Primary Examiner* — Colby M Hansen
(74) *Attorney, Agent, or Firm* — Cantor Colburn LLP

(57) ABSTRACT

A number of variations may include a solenoid assembly comprising: a shaft; a pinion-plunger operatively attached to the shaft and having a first end comprising a plurality of teeth; a plurality of iron cores surrounding at least a portion of the pinion-plunger and the shaft; at least one solenoid coil winding and at least one spool surrounding each of the plurality of iron cores; a stop adjacent a first end of the plurality of iron cores; a guide adjacent a second end of the plurality of iron cores opposite of the stop; a biasing member in operative communication with the first end the pinion-plunger; and wherein the solenoid assembly is constructed and arranged so that when the solenoid assembly is activated the pinion-plunger is magnetically drawn toward the stop.

19 Claims, 5 Drawing Sheets

STARTER

CROSS-REFERENCE TO RELATED APPLICATIONS

This application is a continuation-in-part of U.S. patent application Ser. No. 13/801,668 filed on Mar. 13, 2013.

TECHNICAL FIELD

The field to which the disclosure generally relates to includes starter motors.

BACKGROUND

A vehicle may include a starter motor.

SUMMARY OF ILLUSTRATIVE VARIATIONS

A number of variations may comprise a product comprising: a solenoid assembly comprising: a shaft; a pinion-plunger operatively attached to the shaft and having a first end comprising a plurality of teeth; a plurality of iron cores surrounding at least a portion of the pinion-plunger and the shaft; at least one solenoid coil winding and at least one spool surrounding each of the plurality of iron cores; a stop adjacent a first end of the plurality of iron cores; a guide adjacent a second end of the plurality of iron cores opposite of the stop; a biasing member in operative communication with the first end the pinion-plunger; and wherein the solenoid assembly is constructed and arranged so that when the solenoid assembly is activated the pinion-plunger is magnetically drawn toward the stop.

A number of variations may comprise a starter motor comprising: a shaft; a solenoid assembly surrounding the shaft, wherein the solenoid assembly comprises a pinion-plunger operatively attached to the shaft so that the pinion-plunger rotates with the shaft and moves axially along a portion of the shaft and wherein a first end of the pinion-plunger comprising a plurality of teeth, a plurality of iron cores surrounding at least a portion of the pinion-plunger and the shaft, at least one solenoid coil winding and at least one spool surrounding each of the plurality of iron cores, a stop adjacent a first end of the plurality of iron cores, a guide adjacent a second end of the plurality of iron cores, and a biasing member in operative communication with the first end of the pinion-plunger; a clutch assembly operatively attached to the shaft, wherein the clutch assembly is coaxial with the shaft; a planetary gear set operatively attached to the clutch assembly, wherein the planetary gear set is coaxial with the shaft; an electric motor operatively attached to the planetary gear set, wherein the electric motor is coaxial with the shaft; and wherein the solenoid assembly is constructed and arranged so that when the solenoid assembly is activated the pinion-plunger is magnetically drawn toward the stop.

A number of variations may comprise a method for restarting a vehicle comprising: providing a starter motor comprising: an integrated pinion-plunger solenoid assembly; a clutch assembly operatively attached to the integrated solenoid assembly; a planetary gear set operatively attached to the clutch assembly; and an electric motor operatively attached to the clutch assembly; a first switch in operative communication with the integrated solenoid assembly; a second switch in operative communication with the electric motor; a power source in operative communication with the first switch and the second switch; and an electronic control unit in operative communication with the first switch, the second switch, and the power source; and regulating power to the solenoid assembly and the electric motor independently with the electronic control unit based on a starting condition of the vehicle during a restart.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
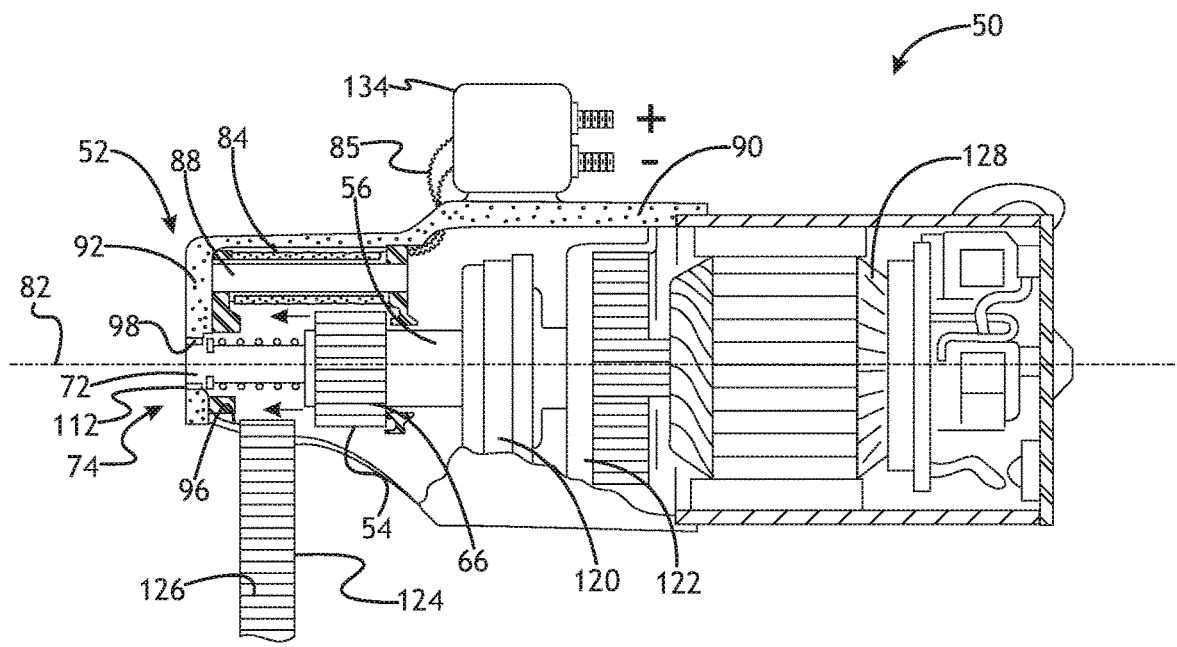
FIG. 1 illustrates a section view of a starter assembly according to a number of variations.

Referring to FIG. 1, in a number of variations, a starter assembly 50 may be constructed and arranged so that a solenoid assembly 52 may provide for the mechanical engagement of the starter pinion 54 with the engine ring gear 124 and a separate electrical switch (not illustrated) may provide for the electrical function of closing the contacts on the electric starter motor 128. This may allow the electrical function of closing the contacts to be separated from the mechanical engagement of the starter pinion 54 into the engine ring gear 124 which may allow the timing of when to apply full current to the starter motor 128 to vary from timing of the engagement of the pinion 54 to the ring gear 124. This may allow for starting of the engine under various starting conditions including, but not limited to, when the engine is completely stopped, or when the engine is rotating several hundred rotations per minute (RPM), or undergoing rock back at engine stop, which may require different controls over the mechanical and electrical operation of the starter assembly 50.

In a number of variations, the starter assembly 50 may include a solenoid assembly 52 which may incorporate a pinion as part of the active plunger 54 in the solenoid assembly 52 so that the engagement solenoid assembly 52 may be directly in the pinion area. This may allow for a reduction of packaging space as the solenoid assembly 52 may be coaxial with the electric starter 128 and may no longer be externally adjacent to the electric starter motor 128. An integrated pinion-plunger solenoid assembly 52 may also allow for a reduced axial length of the starter assembly 50 as a shift lever may no longer be needed. In a number of variations, part count may also be reduced as multiple components including, but not limited to, the plunger, shift level, pivot pin, and shift yoke of the drive mechanism may be eliminated. In a number of variations, constructing the starter assembly 50 so that the engagement solenoid assembly 52 may be directly in the pinion area may also reduce costs of the starter assembly 50 as the required force of the solenoid assembly 52 may be reduced so that the length of wire in each solenoid coil winding 84 of the solenoid assembly 52 may be reduced, which may reduce the copper cost of the solenoid assembly 52. Further, the integrated pinion-plunger solenoid assembly 52 may utilize multiple individual cores 88 instead of a single core having a larger diameter (as will be discussed hereafter), which may require less copper, further reducing costs of the starter assembly 50.

In a number of variations, a starter assembly 50 having an integrated pinion-plunger solenoid 52 may include an output shaft 72 which may rotate about an axis 82 and which may be operatively attached to a clutch assembly 120. In a number of variations, the clutch assembly 120 may be operatively attached to a planetary gear set 122 which may be operatively attached to an electric starter motor 128. In a number of variations, the clutch assembly 120, planetary gear set 122, and the electric starter motor 128 may be coaxial with the output shaft 72. Any number of clutch assemblies 120, planetary gear sets 122, or electric starter motors 128 known in the art may be used. In a number of variations, the integrated pinion-plunger solenoid assembly 52 may surround a portion of the output shaft 72 and may be operably attached to the output shaft 72. In a number of variations, a housing 90 may surround at least a portion of the starter assembly 50. In a number of variations, a portion of the housing 90 adjacent the integrated pinion-plunger solenoid assembly 52 may include a radial cutout or opening 96 in relation to the axis of rotation 82 which, when the pinion-plunger 54 of the integrated pinion-plunger solenoid assembly 52 may be at a maximum travel distance, may allow a plurality of teeth 66 on the pinion-plunger 54 to engage with a plurality of teeth 126 on the ring gear 124 of the engine (not illustrated) to drive the ring gear 124, as will be discussed hereafter. In a number of variations, the housing 90 may be a nose housing and may include an opening 98 defined by an inner surface of the nose 92 of the housing 90 constructed and arranged to support and accommodate a first end 74 of the output shaft 72. In a number of variations, a bushing 112 may be interposed between the housing 90 and the output shaft 72 within the opening 98. In a number of variations, the housing 90 may be a single continuous component or may be multiple pieces attached together. In a number of variations, the housing 90 may comprise a metal.

Figure 2:
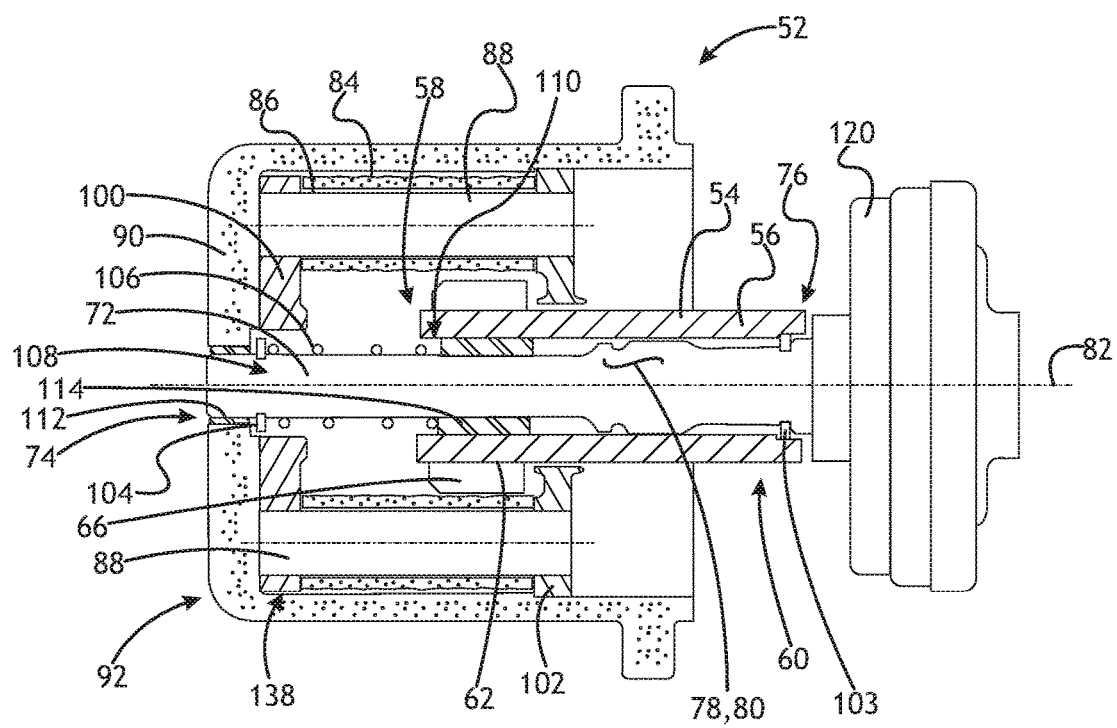
FIG. 2 illustrates a section view of a solenoid assembly and clutch assembly according to a number of variations.
Figure 4:
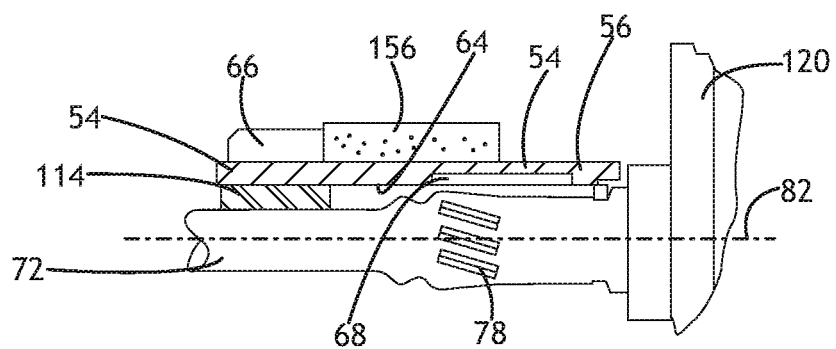
FIG. 4 illustrates a partial section view of a solenoid assembly according to a number of variations.
Figure 5:
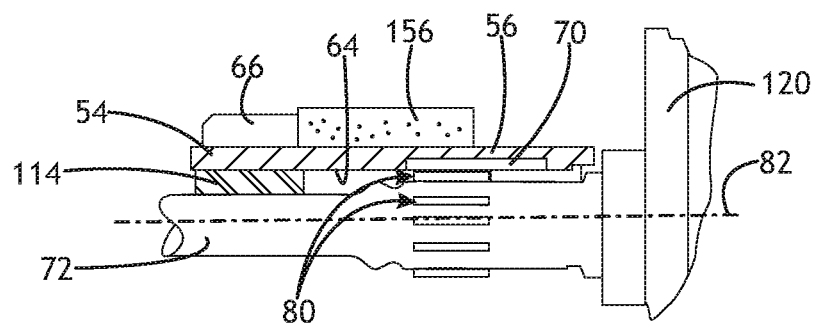
FIG. 5 illustrates a partial section view of a solenoid assembly according to a number of variations.

Referring to FIG. 2, in a number of variations, the pinion-plunger solenoid assembly 52 may comprise a pinion-plunger 54. In a number of variations, the pinion-plunger 54 may include a hollow cylindrical body 56 which may include a first end 58 and a second end 60. In a number of variations, the outer diameter 62 of the first end 58 of the pinion-plunger 54 may include a plurality of pinion teeth 66 which may be constructed and arranged to mesh with a plurality of teeth 126 on an outer diameter of the engine ring gear 124 to drive the ring gear 124. In a number of variations, the pinion-plunger 54 may be a single integral component. In a number of variations, the pinion-plunger 54 may be operably connected to the output shaft 72 so that the pinion-plunger 54 may rotate with the output shaft 72 and ride axially in relation to the axis of rotation 82 along the output shaft 72. In a number of variations, a snap-ring 103 may be attached to the second end 76 of the output shaft 72 to prevent the pinion-plunger 54 from contacting the clutch assembly 120. In a number of variations, the pinion-plunger 54 may be driven axially by a spline 78, 80 on a portion of the output shaft 72. Referring to FIG. 4, in a number of variations, the output shaft 72 may include a helical spline 78 which may mate with a slot having a helical contour 68 on the inner diameter 64 of the pinion-plunger 54 so that the pinion-plunger 54 may ride axially along the output shaft 72 and may be driven through the helical spline 78 on the output shaft 72. Referring to FIG. 5, in another variation, a portion of the output shaft 72 may include a linear or straight spline 80 which may extend axially along the axis of rotation 82 and which may mate with a straight spline contour 70 on the inner diameter 64 of the pinion-plunger 54 so that the pinion-plunger 54 may ride on the output shaft 72 and may be driven along the straight spline 80 on the output shaft 72.

Referring again to FIG. 2, in a number of variations, a bushing 114 may be interposed between the outer diameter of the output shaft 72 and the inner diameter 64 of the pinion-plunger 54 adjacent the first end 58 of the pinion-plunger 54. In a number of variations, a snap ring 104 may be attached to a first end 74 of the output shaft 72 and may be constructed and arranged to support a first end 108 of a biasing member 106. In a number of variations, a second end 110 of the biasing member 106 may be in operative communication with a first end 58 of the pinion-plunger 54 and/or the bushing 114 to bias the pinion-plunger 54 away from the ring gear 124 and toward the clutch assembly 120. Any number of variations of biasing members 106 may be used including, but not limited to, a return spring.

In a number of variations, a first end or nose 92 of the housing 90 may include an iron stop 100 which may surround a portion of the output shaft 72 and a second portion 94 of the housing 90 may include an iron guide component 102 spaced a distance from the iron stop 100 and which may surround a portion of the output shaft 72. The iron stop 100 and the iron guide 102 may be constructed and arranged to accommodate a plurality of iron cores 88. In a number of variations, the plurality of iron cores 88 may extend through and between the iron stop 100 and the iron guide component 102. In a number of variations, a solenoid coil winding 84 and spool 86 may surround each of the iron cores 88.

Figure 3:
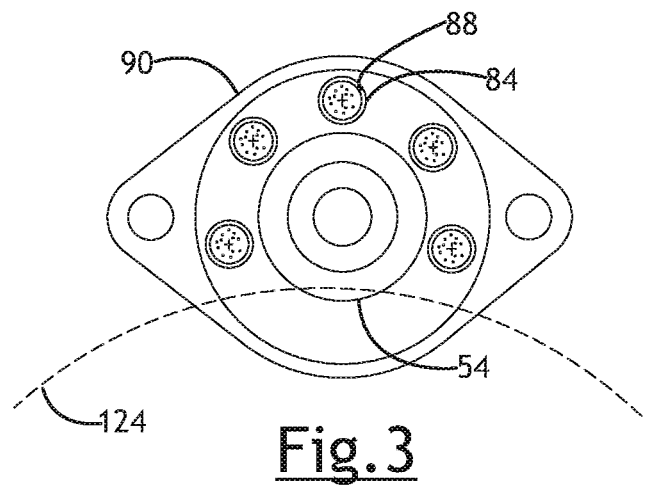
FIG. 3 illustrates a section view of a solenoid assembly according to a number of variations.

Referring again to FIG. 1, in a number of variations, the solenoid assembly 52 may be operatively attached to a switch 134 which may receive power from a power source 130 to activate the solenoid assembly 52. Any number of switches 134 may be used including, but not limited to, electronic switches including, but not limited to, field effect transistors (FETs) or mechanical switches including, but not limited to, mag switches, a variation of which is illustrated in FIG. 1. In a number of variations, lead wires 85 may extend from the solenoid coil windings 84 to the one or more switches 134 to receive power from the power source 130 to activate the solenoid assembly 52. In a number of variations, the lead wires 85 may be insulated and supported. The lead wires 85 may be routed in any number of variations including, but not limited to, out of the nose 92 of the housing 90 and operatively connected to the power source. The connection and pin out may be placed in any number of variations including, but not limited to, the mounting flange (not illustrated), or may be routed back into the solenoid region of the main motor contacts (not illustrated). Referring to FIG. 3, in a number of variations, the individual solenoid coil windings 84 may be connected in parallel. In another variation, the individual solenoid coil windings 84 may be connected in series.

Figure 6:
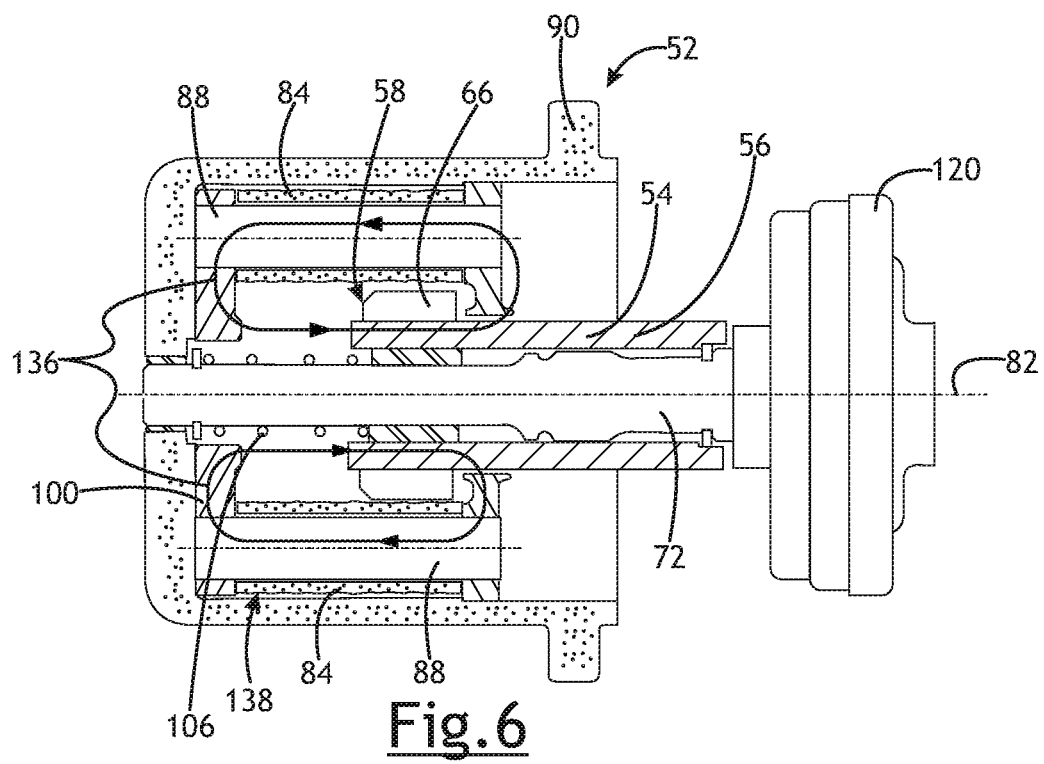
FIG. 6 illustrates a section view of a solenoid assembly and a clutch assembly according to a number of variations.
Figure 7:
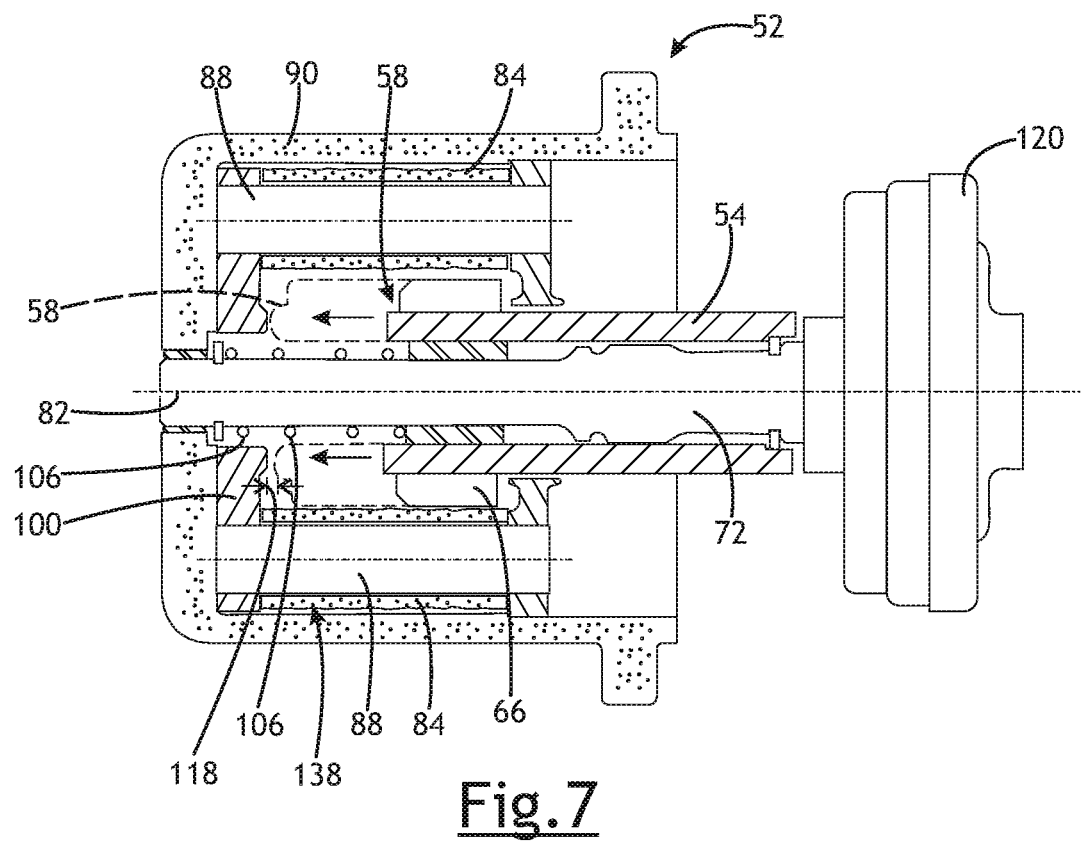
FIG. 7 illustrates a section view of a solenoid assembly and a clutch assembly according to a number of variations.
Figure 12:
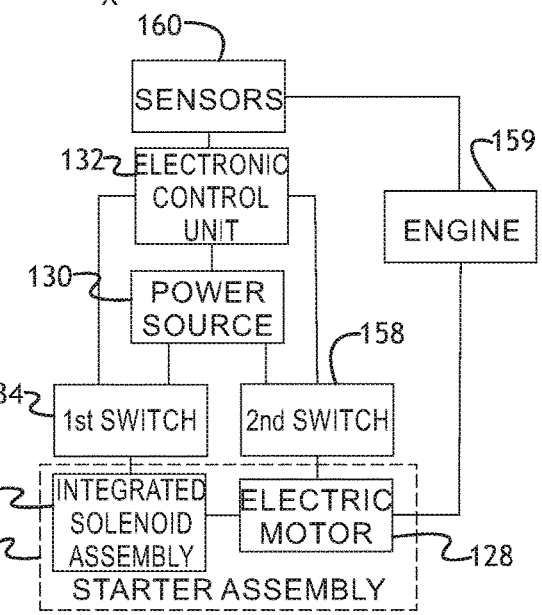
FIG. 12 illustrates a schematic of a starter system according to a number of variations.

Referring to FIG. 12, a power source 130 including, but not limited to, a battery, may be in operative communication with an electronic control unit 132 which may regulate current from the power source 130 to the solenoid assembly 52 during a restart through the switch 134. In a number of variations, when the electronic control unit 132 receives a restart signal, the electronic control unit 132 may send current from the power source 130 to the solenoid assembly 52 to activate the solenoid assembly 52. Referring to FIG. 6, in a number of variations, upon activation of the solenoid assembly 52, the power source 130 may send current to the plurality of solenoid coil windings 84 which may create an electromagnetic flux 136 within the solenoid assembly 52 linking the first end 58 of the pinion-plunger 54 and the iron stop 100 which may create a magnetic force from the iron stop 100. Referring to FIG. 7, in a number of variations, the magnetic force from the iron stop 100 may draw the pinion-plunger 54 along the spline 78, 80 axially along the axis of rotation 82 of the output shaft 72 toward the iron stop 100. As the pinion-plunger 54 draws closer to the iron stop 100, the magnetic force may increase due to the lower air gap reluctance and higher flux density in the components of the pinion-plunger solenoid assembly 52. In a number of variations, as the pinion-plunger 54 is drawn to the iron stop 100, the biasing member 106 may compress together.

Figure 8:
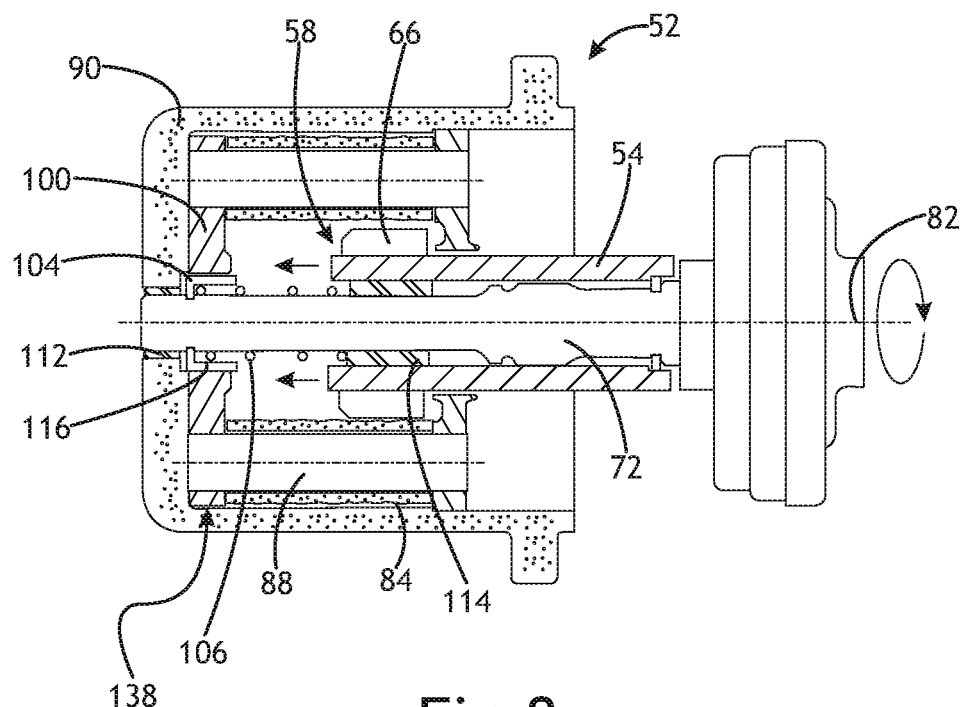
FIG. 8 illustrates a section view of a solenoid assembly and a clutch assembly according to a number of variations.
Figure 9:
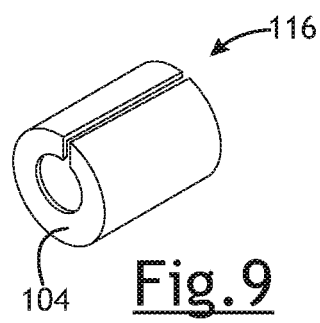
FIG. 9 illustrates a sleeve according to a number of variations.

In a number of variations, the pinion-plunger solenoid assembly 52 may be constructed and arranged so that the first end 58 of the pinion-plunger 54 does not physically touch the iron stop 100 when it reaches its maximum travel position during activation, a variation of which is illustrated in FIG. 7, so that there may be a gap 118 between the first end 58 of the pinion plunger 54 and the iron stop 100. In a number of variations, the gap 118 may prevent friction loss between the rotating pinion-plunger 54 and the stationary iron stop 100. The gap 118 may be accomplished in a number of variations. In one variation, the gap 118 may be accomplished through the solid stack of the compressed biasing member 106 which may have a compressed length which may extend past the iron stop 100 which may prevent the first end 58 of the pinion-plunger 54 from reaching the iron stop 100. Referring to FIGS. 8 and 9, in another variation, a sleeve 116 may extend axially from the snap-ring 104 and may be fitted around the biasing member 106. The sleeve 116 may extend axially a distance toward the pinion-plunger 54 a distance greater than the iron stop 100 and may act as a stop so that the pinion-plunger 54 does not touch the iron stop 100. In a number of variations, the sleeve 116 and the snap ring 104 may be one single continuous component, variations of which are illustrated in FIGS. 8 and 9, or the sleeve 116 and the snap ring 104 may be separate components.

In a number of variations, once the pinion-plunger 54 reaches its maximum travel position during activation, the plurality of teeth 66 on the pinion-plunger 54 may engage with the plurality of teeth 126 on the ring gear 124 to restart the engine. In a number of variations, after partial or total completion of the starting event where the engine has at least partially turned over and combustion beings, the solenoid coil windings 84 may be at least partially deenergized. Once the solenoid coil windings 84 are deenergized, the biasing member 106 may decompress and expand so that the force from the biasing member 106 may push the pinion-plunger 54 away from the ring gear 124 to its starting position.

Figure 11:
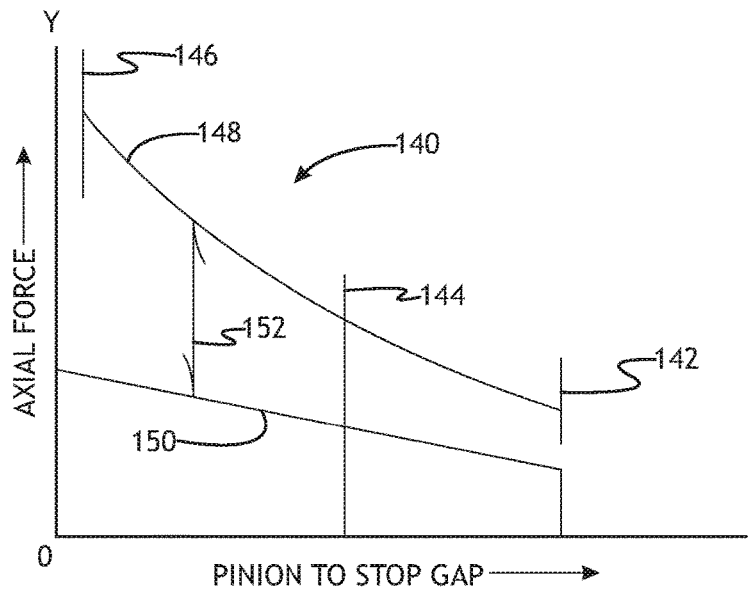
FIG. 11 illustrates a pinion-plunger force and travel curve according to a number of variations.

FIG. 11 illustrates a graph of a pinion-plunger force and travel curve 140 according to a number of variations. In a number of variations, the axial force acting on the pinion-plunger 54 is illustrated as a function of pinion-plunger to stop gap distance. In a number of variations, when the pinion-plunger 54 may be at rest 142 and the pinion-plunger 54 is at a minimum travel distance, the axial force 148 on the pinion-plunger 54 from the magnetic flux field may be a zero or a minimum. In a number of variations, when the solenoid coil windings 84 are at least partially energized, the magnetic force on the pinion-plunger 54 may increase causing the pinion-plunger 54 to move axially toward the ring gear 124 and abutment 144 where the pinion-plunger 54 first contacts the ring gear 124 prior to fully meshing with the ring gear 124 may occur. As the pinion-plunger 54 may be drawn toward the iron stop 100, the biasing member 106 may compress. In a number of variations, when the pinion-plunger 54 reaches its maximum travel distance (which may be spaced a distance from the iron stop 100) and bottoms out 146, the magnetic axial force 148 and the magnetic field flux acting on the pinion-plunger 54 may be at or close to maximum. In a number of variations, after the solenoid coil windings 84 are at least partially deenergized, the magnetic force 148 on the pinion-plunger 54 may decrease, and the reduction of force retaining the pinion-plunger 54 in place may be released so that the biasing member 106 may decompress and expand and the force 150 from the biasing member 106 on the pinion-plunger 54 may assist in returning the pinion-plunger to its starting position away from the ring gear 126 within the housing 90. The net force 152 on the pinion-plunger 54 may be determined by taking the difference between the magnetic force 148 on the pinion-plunger 54 and the force 150 of the biasing member 106 on the pinion-plunger 54.

Referring to FIG. 12, in a number of variations, the starter assembly 50 may be in operative communication with an electronic control unit 132 and at least one power source 130. In a number of variations, the electronic control unit 132 may regulate power from the power source 130 to the integrated pinion-plunger solenoid 52 and the electric starter motor 128 independently from each other through the use of a first switch 134 which may be operatively attached to the integrated pinion-plunger solenoid 52 and a second switch 158 which may be operatively attached to the electric starter motor 128. In a number of variations, the electronic control unit 132 may be in operative communication with one or more sensors 160 which may be in operative communication with the engine 159 of the vehicle and which may be constructed and arranged to detect various operating conditions including, but not limited to, the temperature and/or the rotational speed of the ring gear 126 of the engine 159 during start up to detect various operating conditions of the engine 159 including, but not limited, a "cold start" condition 162, a "stop start" condition 168, a "change of mind start stop" condition 174, and a "soft start" condition 180. In a number of variations, the electronic control unit 132 may then control engagement of the pinion-plunger 54 with the ring gear 124 and the electrical function of closing the contacts on the electric starter motor 128 based on the detected operating conditions.

In a number of variations, a "cold start" condition may occur when a restart is initiated while the temperature of the engine 159 is less than the temperature of the engine 159 during normal operation. In a number of variations, when a restart is initiated during a "cold start" condition, the electronic control unit 132 may first send a signal to activate the solenoid assembly 52 so that the pinion-plunger 54 may fully engage with the ring gear 124 before full power is sent through the electric starter motor 128.

In a number of variations, a "stop-start" condition may occur when a restart is initiated while the engine 159 is started and in an operating state, however, the engine 159 is temporarily deactivated so that the engine 159 has partially or completely ceased moving. In a number of variations, when a restart is initiated, the electronic control unit 132 may send a current to the electric starter motor 128 to synchronize the rotational speed of the pinion-plunger 54 with the rotational speed of the ring gear 124 of the engine 159 before engagement between the pinion-plunger 54 and the ring gear 124 is initiated.

In a number of variations, a "change of mind start-stop" condition may occur when restart is initiated when the engine 159 has already been started from a cold start and the vehicle continues to be in an active state, however, the engine 159 is deactivated but has not ceased movement. In a number of variations, when a restart is initiated, the electronic control unit 132 may send a signal to the electric starter motor 128 to synchronize the rotational speed of the pinion-plunger 54 with the rotational speed of the ring gear 124 of the engine before engagement between the pinion-plunger 54 and the ring gear 124 is initiated which may prevent damage to the pinion-plunger 54 and/or ring gear 124 from milling.

In a number of variations, a "soft start" condition may occur when restart is initiated when the starter motor 128 is running initially at a reduced power. In a number of variations, when a restart is initiated, the electronic control unit 132 may send current to the solenoid assembly 52 to engage the pinion-plunger 54 with the ring gear 124 so that the pinion-plunger 54 and the ring gear 124 are fully engaged before full power is sent through the starter motor 128.

Figure 13:
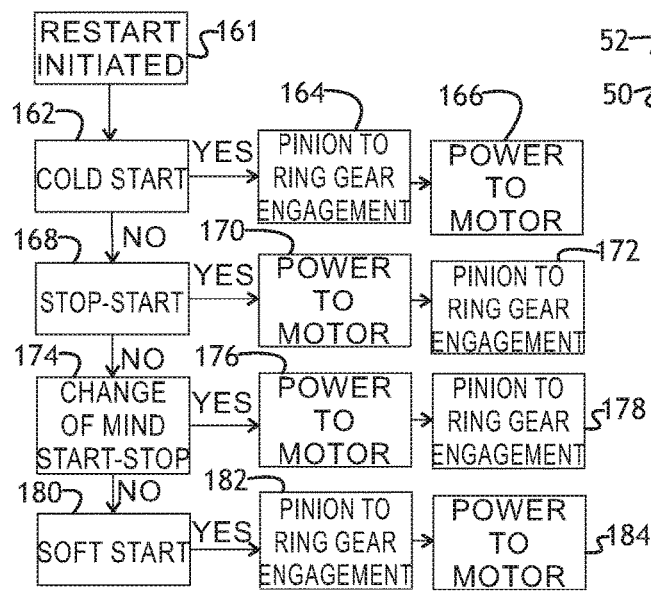
FIG. 13 illustrates a control diagram for a starter system according to a number of variations.

FIG. 13 illustrates a control chart illustrating various control methods during restart of a vehicle. In a number of variations, when a restart 161 is initiated and the electronic control unit 132 detects a "cold start" condition 162, the electronic control unit 132 may send a first command 164 to the first switch 134 to send current from the power source 130 to the integrated pinion-plunger solenoid 52 so that the pinion-plunger 54 and the ring gear 124 fully engage before the electronic control unit 132 sends out a second command 166 to the second switch 158 to send current from the power source 130 to supply full power through the electric starter motor 128.

In a number of variations, when a restart 161 is initiated and the electronic control unit 132 detects a "stop-start" condition 168, the electronic control unit 132 may send a first command 170 to the second switch 158 to send current from the power source 130 to the electric starter motor 128 to synchronize the rotational speed of the pinion-plunger 54 with the rotational speed of the ring gear 124 before sending a second command 172 to the first switch 134 to send current from the power source 130 to the integrated solenoid assembly 52 to cause engagement between the pinion-plunger 54 and the ring gear 124 after the rotational speed of the pinion-plunger 54 and the ring gear 124 are synchronized.

In a number of variations, when restart 161 is initiated and the electronic control unit 132 detects a "change of mind start-stop" condition 174, the electronic control unit 132 may send a first command 176 to the second switch 158 to send current from the power source 130 to the electric starter motor 128 to synchronize the rotational speed of the pinion-plunger 54 with the rotational speed of the ring gear 124 before sending a second command 178 to the first switch 134 to send current from the power source 130 to the integrated pinion-plunger solenoid 52 to cause engagement between the pinion-plunger 54 and the ring gear 124 after the rotational speeds of the pinion-plunger 54 and the ring gear 124 are synchronized.

In a number of variations, when restart 161 is initiated and the electronic control unit 132 detects a "soft start" condition 180 the electronic control unit 132 may send a first command 182 to the first switch 134 to send current from the power source 130 to the integrated pinion-plunger solenoid 52 so that the pinion-plunger 54 fully engages with the ring gear 124 before a second command 184 is send from the electronic control unit 132 to the second switch 158 to send full current from the power source 130 through the starter motor 128.

Figure 10:
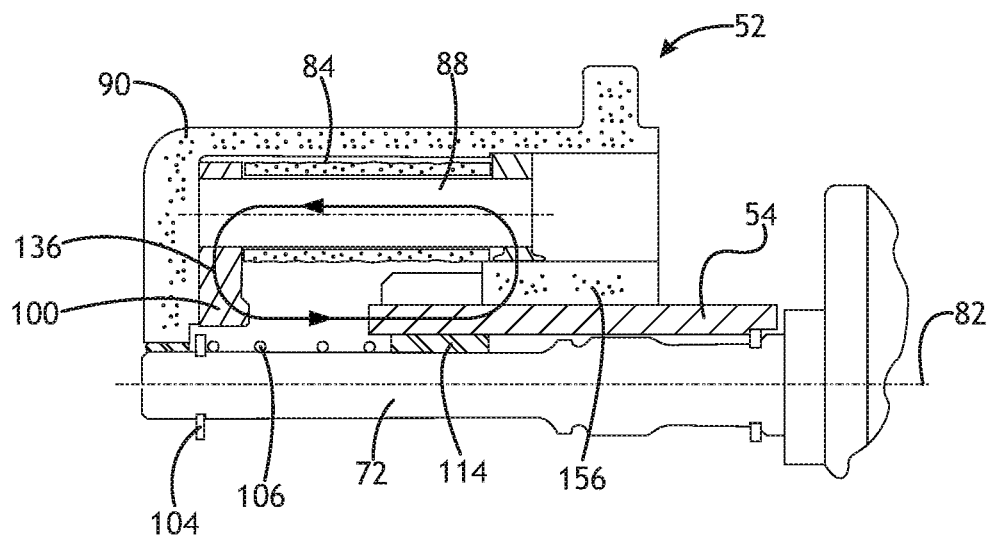
FIG. 10 illustrates a partial section view of a solenoid assembly according to a number of variations.

Referring to FIGS. 2, 6, 7, and 8, in a number of variations, assembly of the pinion-plunger solenoid 52 may comprise assembling the shell 138 of the pinion-plunger solenoid 52 including, but not limited to, the iron stop 100, solenoid coil windings 84, spools 86, iron cores 88, and the iron guide 88, as one piece and then nesting the shell 138 of the pinion-plunger solenoid 52 inside the nose 92 of the housing 90. Referring to FIGS. 4, 5, and 10, in a number of variations, a sleeve 156 may surround at least a portion of the outer diameter 62 of the pinion-plunger 54 adjacent the plurality of teeth 66 in designs where the diameter of the plurality of pinion teeth 66 on the pinion-plunger 54 may protrude larger than the pinion body 56 (depending on actual tooth count), which may facilitate the assembly of the starter motor assembly 50 once the shell 138 may be secured in the housing 90. In a number of variations, the sleeve 156 may be cylindrical. The sleeve 156 may comprise a low carbon steel which may result in a lower magnetic reluctance path for the magnetic flux 136, a variation of which is illustrated in FIG. 10. In a number of variations, the pinion-plunger 54 may comprise a high carbon grade steel which may be hardened which may require a higher current within the solenoid coil winding 84. In a number of variations, the use of the sleeve 156 may facilitate a reduction of the current in the solenoid coil winding 84 to provide sufficient magnetic flux 136 excitation required to induce movement of the pinion-plunger 54. In a number of variations, the flux 136 path may extend through the sleeve 156 in addition to other components while minimizing the flux 136 path through the pinion-plunger 54.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a solenoid assembly comprising: a shaft; a pinion-plunger operatively attached to the shaft and having a first end comprising a plurality of teeth; a plurality of iron cores surrounding at least a portion of the pinion-plunger and the shaft; at least one solenoid coil winding and at least one spool surrounding each of the plurality of iron cores; a stop adjacent a first end of the plurality of iron cores; a guide adjacent a second end of the plurality of iron cores opposite of the stop; a biasing member in operative communication with the first end the pinion-plunger; and wherein the solenoid assembly is constructed and arranged so that when the solenoid assembly is activated the pinion-plunger is magnetically drawn toward the stop.

Variation 2 may include a product as set forth in Variation 1 further comprising: a clutch assembly operatively attached to the shaft; a planetary gear set operatively attached to the clutch assembly; and an electric motor operatively attached to the planetary gear set.

Variation 3 may include a product as set forth in any of Variations 1-2 wherein the solenoid assembly, the clutch assembly, and the electric motor are coaxially aligned.

Variation 4 may include a product as set forth in any of Variations 1-3 further comprising a nose housing, and wherein at least a portion of the stop, the solenoid coil windings, the spools, the iron cores, and the guide are a single assembly inside of a nose of the nose housing.

Variation 5 may include a starter assembly comprising: a shaft; a solenoid assembly surrounding the shaft, wherein the solenoid assembly comprises a pinion-plunger operatively attached to the shaft so that the pinion-plunger rotates with the shaft and moves axially along a portion of the shaft and wherein a first end of the pinion-plunger comprising a plurality of teeth, a plurality of iron cores surrounding at least a portion of the pinion-plunger and the shaft, at least one solenoid coil winding and at least one spool surrounding each of the plurality of iron cores, a stop adjacent a first end of the plurality of iron cores, a guide adjacent a second end of the plurality of iron cores, and a biasing member in operative communication with the first end of the pinion-plunger; a clutch assembly operatively attached to the shaft, wherein the clutch assembly is coaxial with the shaft; a planetary gear set operatively attached to the clutch assembly, wherein the planetary gear set is coaxial with the shaft; an electric motor operatively attached to the planetary gear set, wherein the electric motor is coaxial with the shaft; and wherein the solenoid assembly is constructed and arranged so that when the solenoid assembly is activated the pinion-plunger is magnetically drawn toward the stop.

Variation 6 may include a starter assembly as set forth in Variation 5 wherein the solenoid assembly is constructed and arranged so that when the pinion-plunger reaches a maximum travel position during activation it is prevented from directly touching the stop.

Variation 7 may include a starter assembly as set forth in any of Variations 5-6 wherein when the solenoid assembly is activated, the biasing member compresses and wherein a compressed length of the biasing member acts as a stop and prevents the pinion-plunger from touching the stop.

Variation 8 may include a starter assembly as set forth in any of Variations 5-6 further comprising a sleeve which surrounds a portion of the biasing member, and wherein when the solenoid assembly is activated the pinion-plunger is prevented from touching the stop by the sleeve.

Variation 9 may include a starter assembly as set forth in any of Variations 5-8 further comprising a housing surrounding at least a portion of the starter, and wherein the housing is a nose housing so that a first end of the shaft is supported by the housing.

Variation 10 may include a starter assembly as set forth in any of Variations 5-9 wherein an inner diameter of the pinion-plunger includes a first spline and the shaft includes a mating spline, and wherein the pinion-plunger rides on the shaft and is driven axially along the shaft through the first spline and the mating spline.

Variation 11 may include a starter assembly as set forth in Variation 10 wherein the first spline and the mating spline are helical.

Variation 12 may include a starter assembly as set forth in Variation 10 wherein the first spline and the mating spline are linear.

Variation 13 may include a starter assembly as set forth in any of Variations 5-12 further comprising a sleeve, and wherein the sleeve surrounds at least a portion of the pinion-plunger.

Variation 14 may include a starter assembly as set forth in any of Variations 5-13 further comprising a first switch in operative communication with the solenoid assembly and a second switch in operative communication with the electric motor; a power source operably connected to the first switch and the second switch; an electronic control unit in operative communication with the power source, the first switch, and the second switch, and wherein the electronic control unit regulates power from the power source to the solenoid assembly through the first switch and the electronic control unit regulates power from the power source to the electric motor through the second switch; and wherein the electronic control unit is constructed and arranged to control the solenoid assembly independently from the electric motor.

Variation 15 may include a starter assembly as set forth in Variation 14 wherein the starter is constructed and arranged to allow for starting of an engine during at least one of a cold start condition, a-stop start condition, a change of mind start condition, or a soft start condition.

Variation 16 may include a starter assembly as set forth in Variation 15 wherein the starter is constructed and arranged so that for a restart during the cold start condition, the electronic control unit sends power to the solenoid assembly so that the pinion-plunger is fully engaged with a ring gear of the engine before the electronic control unit sends a full power through the electric motor.

Variation 17 may include a starter assembly as set forth in any of Variations 15-16 wherein the starter is constructed and arranged so that for a restart during the stop-start condition, the electronic control unit sends power to the electric motor to synchronize the speed of the pinion-plunger with a ring gear of the engine before the electronic control unit sends power to the solenoid assembly for engagement of the pinion-plunger and the ring gear.

Variation 18 may include a starter assembly as set forth in any of Variations 15-17 wherein the starter is constructed and arranged so that for a restart during the change of mind start-stop condition, the electronic control unit sends power to the electric motor to synchronize the speed of the pinion-plunger with a ring gear of the engine before the electronic control unit sends power to the solenoid assembly for engagement of the pinion-plunger and the ring gear.

Variation 19 may include a starter assembly as set forth in any of Variations 15-18 wherein the starter is constructed and arranged so that for a restart during the soft start condition, the electronic control unit sends power to the solenoid assembly so that the pinion-plunger is fully engaged with a ring gear of the engine before the electronic control unit sends a full power through the electric motor.

Variation 20 may include a method for restarting an engine comprising: providing a starter assembly comprising: an integrated pinion-plunger solenoid assembly; a clutch assembly operatively attached to the integrated solenoid assembly; a planetary gear set operatively attached to the clutch assembly; and an electric motor operatively attached to the clutch assembly; a first switch in operative communication with the integrated solenoid assembly; a second switch in operative communication with the electric motor; a power source in operative communication with the first switch and the second switch; and an electronic control unit in operative communication with the first switch, the second switch, and the power source; and regulating power to the solenoid assembly and the electric motor independently with the electronic control unit based on a starting condition of the engine during a restart.

The above description of select variations within the scope of the invention is merely illustrative in nature and, thus, variations or variants thereof are not to be regarded as a departure from the spirit and scope of the invention.

What is claimed is:

1. A product comprising:
   a solenoid assembly comprising: a shaft; a pinion-plunger operatively attached to the shaft and having a first end comprising a plurality of teeth; a plurality of iron cores surrounding at least a portion of the pinion-plunger and the shaft; at least one solenoid coil winding and at least one spool surrounding each of the plurality of iron cores; a stop adjacent a first end of the plurality of iron cores; a guide adjacent a second end of the plurality of iron cores opposite of the stop; a biasing member in operative communication with the first end the pinion-plunger; and
   wherein the solenoid assembly is constructed and arranged so that when the solenoid assembly is activated the pinion-plunger is magnetically drawn toward the stop.

2. The product of claim 1 further comprising:
   a clutch assembly operatively attached to the shaft;
   a planetary gear set operatively attached to the clutch assembly; and
   an electric motor operatively attached to the planetary gear set.

3. The product of claim 1 wherein the solenoid assembly, the clutch assembly, and the electric motor are coaxially aligned.

4. The product of claim 1 further comprising a nose housing, and wherein at least a portion of the stop, the solenoid coil windings, the spools, the iron cores, and the guide are a single assembly inside of a nose of the nose housing.

5. A starter assembly comprising:
   a shaft;
   a solenoid assembly surrounding the shaft, wherein the solenoid assembly comprises a pinion-plunger operatively attached to the shaft so that the pinion-plunger rotates with the shaft and moves axially along a portion of the shaft and wherein a first end of the pinion-plunger comprising a plurality of teeth, a plurality of iron cores surrounding at least a portion of the pinion-plunger and the shaft, at least one solenoid coil winding and at least one spool surrounding each of the plurality of iron cores, a stop adjacent a first end of the plurality of iron cores, a guide adjacent a second end of the plurality of iron cores, and a biasing member in operative communication with the first end of the pinion-plunger;
   a clutch assembly operatively attached to the shaft, wherein the clutch assembly is coaxial with the shaft;
   a planetary gear set operatively attached to the clutch assembly, wherein the planetary gear set is coaxial with the shaft;
   an electric motor operatively attached to the planetary gear set, wherein the electric motor is coaxial with the shaft; and
   wherein the solenoid assembly is constructed and arranged so that when the solenoid assembly is activated the pinion-plunger is magnetically drawn toward the stop.

6. The starter assembly of claim 5, wherein the solenoid assembly is constructed and arranged so that when the pinion-plunger reaches a maximum travel position during activation it is prevented from directly touching the stop.

7. The starter assembly of claim 5 wherein when the solenoid assembly is activated, the biasing member compresses and wherein a compressed length of the biasing member acts as a stop and prevents the pinion-plunger from touching the stop.

8. The starter assembly of claim 5 further comprising a sleeve which surrounds a portion of the biasing member, and wherein when the solenoid assembly is activated the pinion-plunger is prevented from touching the stop by the sleeve.

9. The starter assembly of claim 5 further comprising a housing surrounding at least a portion of the starter, and wherein the housing is a nose housing so that a first end of the shaft is supported by the housing.

10. The starter assembly of claim 5 wherein an inner diameter of the pinion-plunger includes a first spline and the shaft includes a mating spline, and wherein the pinion-plunger rides on the shaft and is driven axially along the shaft through the first spline and the mating spline.

11. The starter assembly of claim 10 wherein the first spline and the mating spline are helical.

12. The starter assembly of claim 10 wherein the first spline and the mating spline are linear.

13. The starter assembly of claim 5 further comprising a sleeve, and wherein the sleeve surrounds at least a portion of the pinion-plunger.

14. The starter assembly of claim 5 further comprising a first switch in operative communication with the solenoid assembly and a second switch in operative communication with the electric motor;
   a power source operably connected to the first switch and the second switch;
   an electronic control unit in operative communication with the power source, the first switch, and the second switch, and wherein the electronic control unit regulates power from the power source to the solenoid assembly through the first switch and the electronic control unit regulates power from the power source to the electric motor through the second switch; and
   wherein the electronic control unit is constructed and arranged to control the solenoid assembly independently from the electric motor.

15. The starter assembly of claim 14, wherein the starter is constructed and arranged to allow for starting of an engine during at least one of a cold start condition, a-stop start condition, a change of mind start condition, or a soft start condition.

16. The starter assembly of claim 15 wherein the starter is constructed and arranged so that for a restart during the cold start condition, the electronic control unit sends power to the solenoid assembly so that the pinion-plunger is fully engaged with a ring gear of the engine before the electronic control unit sends a full power through the electric motor.

17. The starter assembly of claim 15 wherein the starter is constructed and arranged so that for a restart during the stop-start condition, the electronic control unit sends power to the electric motor to synchronize the speed of the pinion-plunger with a ring gear of the engine before the electronic control unit sends power to the solenoid assembly for engagement of the pinion-plunger and the ring gear.

18. The starter assembly of claim 15 wherein the starter is constructed and arranged so that for a restart during the change of mind start-stop condition, the electronic control unit sends power to the electric motor to synchronize the speed of the pinion-plunger with a ring gear of the engine before the electronic control unit sends power to the solenoid assembly for engagement of the pinion-plunger and the ring gear.

19. The starter assembly of claim 15 wherein the starter is constructed and arranged so that for a restart during the soft start condition, the electronic control unit sends power to the solenoid assembly so that the pinion-plunger is fully engaged with a ring gear of the engine before the electronic control unit sends a full power through the electric motor.

\* \* \* \* \*